United States Patent [19]

Kondo

[11] Patent Number: 4,865,163

[45] Date of Patent: Sep. 12, 1989

[54] DISK BRAKE ASSEMBLY

[75] Inventor: Toshio Kondo, Okazaki, Japan

[73] Assignee: Aisin Seiki Kabushiki Kaisha, Kariya, Japan

[21] Appl. No.: 137,591

[22] Filed: Dec. 24, 1987

[30] Foreign Application Priority Data

Dec. 25, 1986 [JP] Japan .......................... 61-202384[U]

[51] Int. Cl.$^4$ .............................................. F16D 65/38
[52] U.S. Cl. ................................ 188/73.37; 188/73.1; 188/73.38; 192/30 V
[58] Field of Search ............... 188/73.35, 73.36, 73.37, 188/73.38, 73.1, 250 B; 192/30 V

[56] References Cited

U.S. PATENT DOCUMENTS

| | | | |
|---|---|---|---|
| 3,166,159 | 1/1965 | Burnett | 188/73.35 X |
| 3,429,405 | 2/1969 | Frigger | 188/73.38 X |
| 3,684,061 | 8/1972 | Ogawa et al. | 188/73.37 |
| 4,064,975 | 12/1977 | Filderman | 188/73.37 |
| 4,093,045 | 6/1978 | Kawamura | 188/73.37 |
| 4,445,594 | 5/1984 | Hoffman, Jr. | 188/73.37 |
| 4,603,760 | 8/1986 | Myers | 188/73.37 |

FOREIGN PATENT DOCUMENTS

| | | | |
|---|---|---|---|
| 54496 | 6/1982 | European Pat. Off. | 188/73.35 |
| 2711729 | 9/1977 | Fed. Rep. of Germany | 188/73.36 |
| 57526 | 4/1983 | Japan | 188/73.37 |

Primary Examiner—George E. A. Halvosa
Attorney, Agent, or Firm—Burns, Doane, Swecker & Mathis

[57] ABSTRACT

A disk brake assembly which includes a rotary brake disk rotatable with a wheel in a body, a mounting member fixed to a stationary member of a vehicle, a guide member disposed in parallel with an axial direction of the brake disk and fixed at one end portion to the mounting member, a caliper member having a tubular portion slidably supported on the guide member to be movable in an axial direction, and the caliper member straddling a portion of the brake disk and having a fluid actuator provided with a piston on one side thereof to press a first brake pad against one face of the brake disk and a reaction portion on the opposite side thereof to press a second brake pad against the other face of the brake disk. The second brake pad has a projection portion projected against the reaction portion of the caliper member on its backing plate, the reaction portion of the caliper member having a hole receiving the projection portion and supporting the projection portion, and a shim is interposed between the reaction portion of the caliper member and the backing plate of the second brake pad, the shim having a hole receiving the projection portion of the second brake pad rotatably.

1 Claim, 4 Drawing Sheets

DISK BRAKE ASSEMBLY

BACKGROUND OF THE INVENTION

1. Field of the Invention

The present invention relates to a disk brake assembly for wheeled vehicles, and more particularly to a disk brake assembly includes a shim for preventing an uncomfortable squeak noise termed a "disk brake-echo". This is a phenomenon generated by the frictional contact between a brake pad and a caliper member, when the disk brake assembly is operated.

2. Description of the Prior Art

A disk brake assembly frequently generates what is termed a "disk brake-echo" phenomenon by a slip which occurs between the brake pad and the caliper member, when the disk brake assembly is operated. It is generally thought that the generation of the uncomfortable "disk brake-echo" phenomenon is caused by a minute vibration of the brake pad due to frictional engagement between the brake pad and the brake disk when the brake pad is pressed against the rotating brake disk. The vibration of the brake pad causes sympathetic vibrations of the brake disk or the caliper member. The sympathetic vibrations become an audio frequency which is then communicated with the occupant of wheeled vehicles as the squeak noise and make the occupant feel uncomfortable.

For preventing the uncomfortable squeak noise or "disk brake-echo" phenomenon, it has been proposed to provide a shim interposed between the caliper member and the brake pad in the prior art. A conventional disk brake of this kind is disclosed, for example, in U.S. Pat. No. 3,848,708, and Japanese Utility Model application laid-open publication No. 58-129,343 published on Sept. 1, 1983. These conventional disk brakes include having the shim interposed between the caliper member and the brake pad so as to absorb the vibration from the brake pad to caliper member. The shim consists of a steel plate and vibration-proof material covering the steel plate. The shim includes an engagement portion engaged with the brake pad so as to prevent slip of the shim with respect to the brake pad by relative displacement between the brake pad and the caliper member. The relative displacement is generated when the disk brake is operated. The shim includes an opening portion for exchanging the distribution of the surface pressure of the brake pad.

In the above conventional disk brake, however, the engagement portion is transformed by the relative displacement between the brake pad and the caliper member generated when the brake is operated under high load condition or under extended use of the disk brake. As a result, the engaging force of the engagement portion with respect to the brake pad falls and the shim slips with respect to the brake pad. Therefore, there is a drawback in the prior art that the assembly of the disk brake is damaged, since the caliper member or the piston only presses a part of the shim, the separation of the vibration-proof material is in a boundary portion between a pressed portion and an unpressed portion of the shim. Therefore, the durability of the shim is affected and, since the shim includes the opening portion, it is not possible to use the same shim on both of the left and right wheels.

SUMMARY OF THE INVENTION

It is, therefore, an object of the present invention to prevent the position slip of the shim with respect to the brake pad.

It is another object of the present invention to improve the performance of the durability of the shim.

It is a further object of the present invention to provide an improved disk brake assembly which includes a rotary brake disk rotated with a wheel of a vehicle, a mounting member fixed to a stationary member of a vehicle, a guide member positioned in parallel with an axial direction of the brake disk and fixed at one end portion to the mounting member, a caliper member having a tubular portion slidably supported on the guide member to be movable in an axial direction, the caliper member straddling a portion of the brake disk and having a fluid actuator provided with a piston on one side thereof to press a first brake pad against one face of the brake disk and a reaction portion on the opposite side thereof to press a second brake pad against the other face of the brake disk, the second brake pad having a projection portion projecting against the reaction portion of the caliper member on its backing plate, the reaction portion of the caliper member having a hole receiving the projection portion and supporting the projection portion, and a shim interposed between the reaction portion of the caliper member and the backing plate of the second brake pad and having a hole rotatably receiving the projection portion of the second brake pad.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENT

Figure 1:
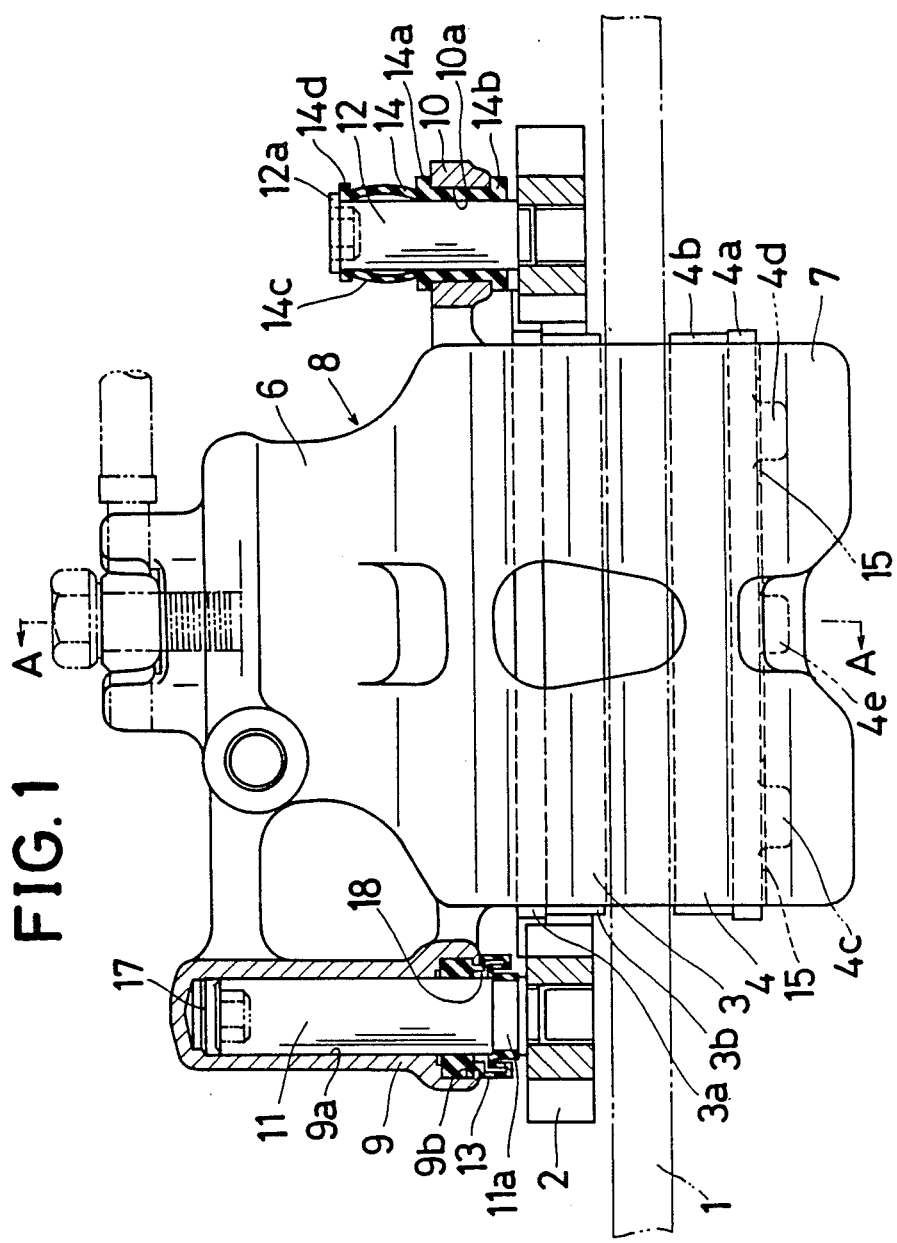
FIG. 1 is an elevation view partly in section of a disk brake assembly in accordance with the present invention.

A disk brake assembly in accordance with a preferred embodiment of the present invention will be described with reference to the drawings.

In FIG. 1–FIG. 8 of the appended drawings, there is illustrated a disk brake assembly of the pin slide type in accordance with the present invention which includes a rotary brake disk 1 secured for a rotation with a road wheel of an automotive vehicle, a mounting member 2 fixed to a stationary member of a body structure of the vehicle such as a knuckle member (not shown) at the inside of the brake disk 1, an inner brake pad 3 carried on the mounting member 2 at the inside of the brake disk 1, a caliper member 8 straddling a portion of the brake disk 1, guide pins 11, 12 in parallel fixed to the mounting member 2 to support thereon the caliper member 8, and an outer brake pad 4 carried on the caliper member 8 at the outside of the brake disk 1.

The mounting member 2 has a pair of arms 2a, 2b and is formed with a pair of recessed portions 2c, 2d wherein a pair of ear portions 3c, 3d of a backing plate 3a of the inner brake pad 3 are assembled to be axially movable. The inner brake pad 3 is provided with an inner friction pad 3b secured to the backing plate 3a. The backing plate 3a is formed with a pair of recessed portions 3e, 3f extending toward an axial direction of brake disk 1 at its lower side surface and positioned symmetrically with respect to a center line of inner brake pad 3 in the radial direction of the brake disk 1 as shown by FIG. 7.

In the center of the supporting surface 2e of the mounting member 2, a plate spring 19 is disposed and the plate spring 19 is provided with a first holding portion 19a and a second holding portion 19b which clips the mounting member 2 therein to be immovable with respect to forward and rearward directions of the vehicle by a guide portion 19c. The guide portion 19c is elastically fitted into a concave portion 2f. The plate spring 19 is further provided with a pair of arm portions 19e, 19f which extend in the forward and rearward directions of the vehicle along the supporting surface 2e and which are in a spring-loaded contact with the lower side surface of the backing plate 3a. Both arm portions 19e, 19f are formed with end portions 19g, 19h extending toward an axial direction of the brake disk 1 at its end portion, respectively. The end portions 19g, 19h are elastically fitted into the recessed portions 3e, 3f, respectively.

Figure 7:
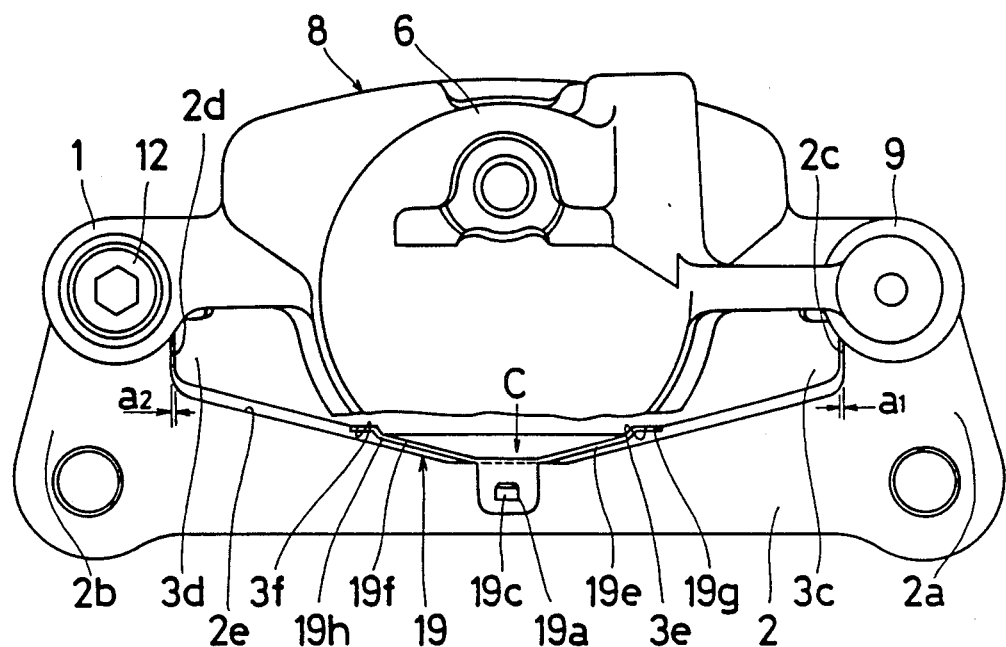
FIG. 7 is a side view of FIG. 1.
Figure 8:
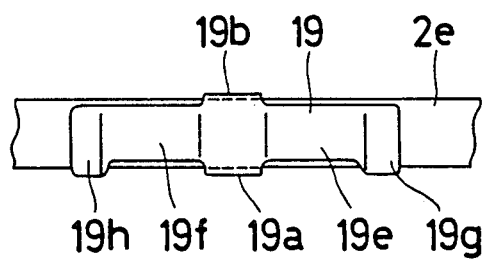
FIG. 8 is an elevation view of a portion of FIG. 7 indicated by numeral C in FIG. 7.

According to this structure, the inner brake pad 3 is able to smoothly slide on the end portions 19g, 19h and is positioned in the center of the supporting surface 2e of the mounting member 2 so as to have equal clearances a1, a2 between the ear portions 3c, 3d and the recessed portions 2c, 2d as shown by FIG. 7. As a result, the generation of sound due to impact between the ear portions 3c, 3d and the recessed portions 2c, 2d is prevented. Since the end portions 19g, 19h extend axially with respect to the rotation axis of the disk I a distance greater than that of the thickness of the supporting surface 2e of the mounting member, when the plate spring 19 is mounted to the mounting member 2 the end portions 19g, 19h are extended from the mounting member 2 toward the center of the vehicle, the recessed portions 3e, 3f are engaged with end portions 19g, 19h before the inner brake pad 3 is mounted to the supporting surface 2e of the mounting member 2. Therefore, exchanging of the inner brake pad 3 can be easily and accurately attained.

The caliper member 8 is formed by an evaporative pattern casting process and has a C-shaped cross-section for straddling the brake disk 1 and both the brake pads 3, 4 and has a cylinder body 6 and a reaction portion 7. The reaction portion 7 consists of two portions to press the outer brake pad 4. The caliper member 8 is integrally formed at opposite ends thereof with tubular portions 9, 10 which are slidably supported on the guide pins 11, 12 o be movable in the axial direction of brake disk 1. Within a cylindrical bore formed in the cylinder body 6, a cup-shaped piston 5 is axially slidably disposed through an annular sealing member 20 to press the inner brake pad 3 directly against one face of the brake disk 1. The annular sealing member 20 has the well-known function of retracting the piston 5 in response to release of pressurized fluid applied thereto. An annular elastic boot 21 is disposed to enclose the sliding portion between the piston 5 and the cylinder body 6.

The tubular portion 9 is provided with a cylindrical bore 9a having a bottom portion which is slidably supported on the guide pin 11 fixedly threaded into the mounting member 2 at one end portion so as to be movable in the axial direction of brake disk 1. The guide pin 11 is provided thereon with an elastic pin boot 13 which is arranged to protect the sliding portion between the guide pin 11 and the cylindrical bore 9a. The elastic pin boot 13 is fixedly engaged at one end with annular grooves 11a and at its other end with annular grooves 9b formed in the tubular portion 9. The elastic pin boot 13 forms an airtight chamber 18 between the annular grooves 11a, 9b of the guide pin 11 and the tubular portion 9, respectively. The airtight chamber 18 is a reservoir for the grease which lubricates the sliding portion of the guide pin 11. The cylindrical bore 9a is provided with grooves (not shown) which extend from the bottom portion to the annular groove 11a. The grooves are formed at he same time when the caliper member 8 is formed by the evaporative pattern casting process, and the grooves are formed at the free position on the guide pin 11 so as to avoid the position where the brake torque and the vibration load of the vehicles are reacted. The elastic pin boot 13 is provided with grooves (not shown) at an inside surface of its other end, and the grooves are formed so as to slip with respect to the grooves of the cylindrical bore 9a. According to this structure, since an air chamber 17 is formed between the bottom portion and the guide pin 11 and is communicated with the airtight chamber 18 through both grooves, assembly of the disc brake is simplified. Since a pressure difference between the air chamber 17 and the airtight chamber 18 is not generated by both grooves even when the caliper member 8 has a large length of travel, for example, when the inner and outer friction pads wear, the caliper member 8 can smoothly slide on the guide pin 11.

The tubular portion 10 is provided with a penetrating bore 10a which is slidably supported on the guide pin 12 fixedly threaded into the mounting member 2 at one end portion to be movable in the axial direction of the brake disk 1 through an elastic boot 14. The guide pin 12 is also provided with a flange portion 12a at its other end portion. The elastic boot 14 is fitted into the penetrating bore 10a so as to be fixed in the axial direction of brake disk 1 by guide portions 14a, 14b. The elastic pin boot 14 is in the form of a hollow boot which the guide pin 12 is fitted into. The elastic boot 14 is provided with a sleeve portion 14c which extends from the guide portion 14a in a direction away from inside of the brake disk 1 and which surrounds the guide pin 12 to protect the sliding portion of the guide pin 12. The sleeve portion 14c is in the form of a thin sleeve and is provided with a flange portion 14d which is contacted with the flange portion 12a of the guide pin 12 by its own elastic force at its end portion. According to this structure, since the capacity of the inside space of the sleeve portion 14c is not increased even though the caliper member 8 travels a greater distance when the inner and outer friction pads 3b, 4b wears, a negative pressure is not generated in the inside space of the sleeve portion 14c. As a result, the caliper member 8 can smoothly slide on the guide pin 12 without the generation of negative pressure in the space inside the sleeve portion 14c, and it is able to protect the sliding portion of the guide pin 12. The compressed air in the space inside of the sleeve portion 14c is discharged from the contact surface between both flange portions 12a, 14d of the guide pin 12 and the elastic pin boot 14, respectively. Vibration of the capacity of the sleeve portion 14c is absorbed by the elasticity of the sleeve portion 14c.

Figure 2:
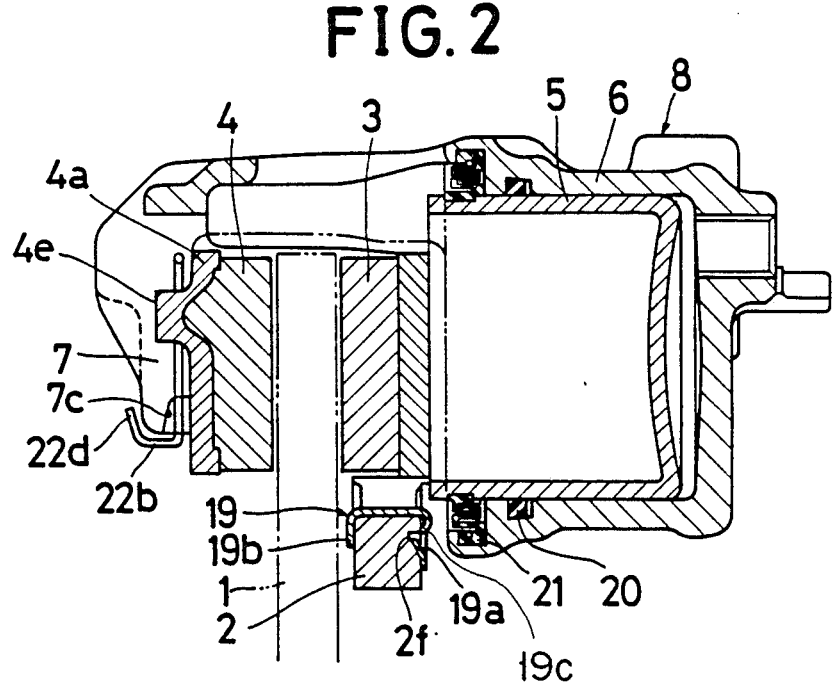
FIG. 2 is a sectional view taken substantially along the line A—A of FIG. 1.
Figure 3:
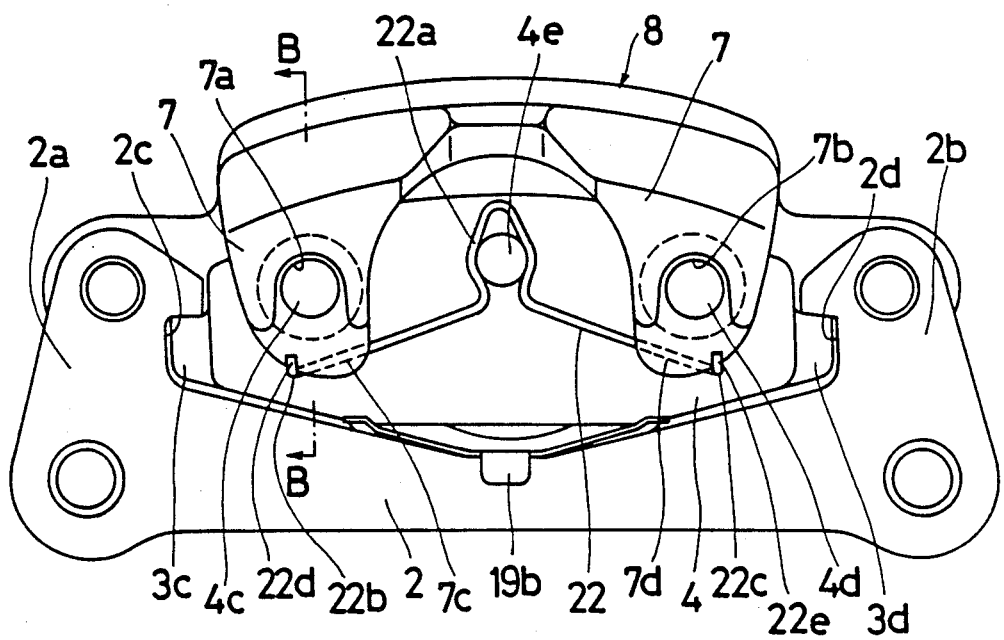
FIG. 3 is a side view of FIG. 1.
Figure 4:
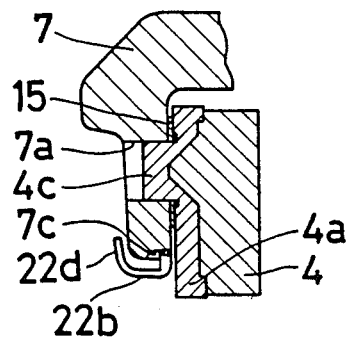
FIG. 4 is a sectional view taken substantially along the line B—B of FIG. 3.
Figure 5:
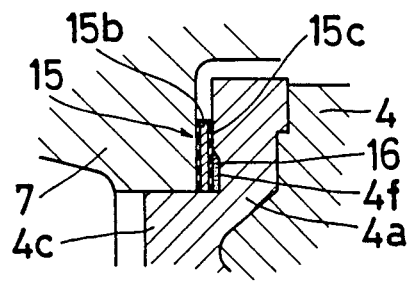
FIG. 5 is a partly enlarged sectional view of FIG. 4.
Figure 6:
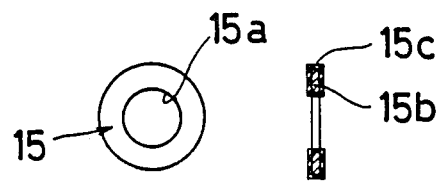
FIG. 6 shows a shim of a disk brake assembly in accordance with the present invention.

The outer brake pad 4 consists of the backing plate 4a and an outer friction pad 4b secured to the backing plate 4a. The outer brake pad 4 is pressed to the other face of the brake disk 1 by the reaction portion 7. The backing plate 4a is provided with a pair of the first projection portions 4c, 4d projected against the reaction portion 7. The reaction portion 7 is provided with a pair of holes 7a, 7b which the first projection portions 4c, 4d are fitted therein at two extended sections of the portion 7, respectively. According to this structure, the outer brake pad 4 is supported on the reaction portion 7 of the caliper member 8 by the first projection portions 4c, 4d. The outer backing plate 4a is further provided with a second projection portion 4e at the center of the first projection portions 4c, 4d so as to be positioned between the two extended sections of the reaction portion 7 toward the outside of the brake disk 1. The first and the second projection portions 4c, 4d, 4e are shaped by means of a press during manufacture thereof. The inner brake pad 4 is urged toward the direction of an axial center of the brake disk 1 and the outside of the brake disk 1 by a detent spring 22 which is disposed between the second projection portion 4e and the two extended sections of the reaction portion 7. The detent spring 22 is provided with a center clipping portion 22a which is elastically clipped to the second projection portion 4e and has a diameter smaller than a diameter of the second projection portion 4e. The detent spring 22 is further provided with two bending portions 22b, 22c which extend from the center clipping portion 22a to concave portions 7c, 7d formed at the lower end portion of the inside (disk I facing side) of the two extended sections of the reaction portion 7 and which are engaged with the lower portion of the reaction portion 7 as shown by FIG. 2 and FIG. 4, respectively. The detent spring 22 is further provided with rising portions 22d, 22e end of the bending portion 22b, 22c and engaged with the lower portion outside of the respective extended section of the reaction portion.

According to this structure, free play of the outer brake pad 4 in the radial direction of the brake disk 1 is eliminated by the detent spring 22 and the engagement of the projections 4c, 4d, with the holes 7a, 7b, to thereby prevent the condition in which the outer friction pad 4b of the outer brake pad 4 is contacted with the other face of the brake disk 1. Since the installation and removal of the detent spring 22 can be performed without difficulty by means of adding a load to the bending portions 22b, 22c in a direction toward each other, the detent spring 22 has a durability which permits reuse. Since the engaging force of the center clipping portion 22a with respect to the second projection portion 4e is reinforced by the engagement between the bending portion 22b, 22c and a portion of the reaction portion 7, the detent spring 22 is not necessary to control the accuracy of its dimensions and its manufacturing cost can be reduced. When the brake pads 3, 4 are exchanged, the guide pin 12 is removed from the mounting member 2 and the caliper member 8 is rotated about the guide pin 11 with the outer brake pad 4.

A shim 15 is interposed between each of the extended sections of the reaction portion 7 and the backing plate 4a of the outer brake pad 4, respectively, and the shim 15 is provided with a hole 15a which is fitted on one of the first projection portions 4c, 4d, respectively. The shim 15 consists of a steel plate 15b and a vibration-proof material 15c, such as rubber, covered on both sides of the steel plate 15b. An annular arrangement of grooves 4f surround the first projection portion 4c formed at the base portion of the first projection portions 4c, 4d, respectively, and the annular grooves 4f have a width in the radial direction smaller than a width of the shim 15 in the radial direction. Grease or lubricant compositions 16 are filled in the annular grooves 4f so as to decrease the friction resistance between the shim 15 and the backing plate 4a.

When a fluid pressure from the master cylinder (not shown) is applied to the cylinder body 6 of the caliper member 8, the piston 5 slides and presses the inner brake pad 3 to one face of the brake disk 1. At the same time, the caliper member 8 slides on the guide pins 11, 12 at the tubular portions 9, 10 toward the center of the vehicle and the reaction portion 7 presses the outer brake pad 4 to the other face of the brake disk 1.

At this time, a minute vibration of the outer brake pad 4 in the axial direction and in the direction of rotation of the brake disk 1 is caused by the friction resistance between the brake disk 1 and the outer friction pad 4b. In the present invention, however, the minute vibration of the outer brake pad 4 in the direction of the rotation of the brake disk 1 does not cause a stick and slip situation between the outer brake pad 4 and the reaction portion 7 due to the grease 16 filled in the annular grooves 4f. The minute vibration of the outer brake pad 4 in the axial direction of the brake disk 1 is dampened or restrained from communication with the reaction portion 7 by the shim 15 and the grease 16. The vibration-proof material 15c of the shim 15 and the grease or lubricant 16 absorbs the minute vibration of the outer brake pad 4 in the axial direction of the brake disk 1. As mentioned above, the generation of the uncomfortable squeak noise, what is called "disk brake-echo" phenomenon is prevented.

In the present invention, the slip position of the shim 15 with respect to outer brake pad 4 is prevented by the first projection portions 4c, 4d. Further, since the bending process for forming the engagement portion of the prior art is not necessitated, it is possible to reduce the manufacturing cost of the shim. Furthermore, since the engagement portion is not required, the shim 15 according to present invention can be minimized in size and also functions for preventing the "disk brake-echo". The shim 15 according to the present invention is pressed by the extended sections of the reaction portion 7 at its surface. Therefore, the separation of the vibration-proof material is prevented and the durability performance of the shim is improved.

According to the present invention, it is also possible to use the same shim for left and right wheels. Furthermore, it is possible to interpose the shim 15 only at the first projection portion and therefore, prevent the biasing wear of the friction pad.

Although certain specific embodiments of the present invention have been shown and described, it is obvious that many modifications thereof are possible. The present invention, therefore, is not intended to be restricted to exact showing of the drawings and description thereof, but is considered to include reasonable and obvious equivalents.

What is claimed is:

1. A disk brake assembly, comprising:
a rotary brake disk rotated with a wheel of a vehicle,
a mounting member fixed to a stationary member of the vehicle,
a guide member extending in an axial direction parallel to an axis of rotation of said brake disk and fixed at one end portion to said mounting member,
a caliper member having a tubular portion slidably supported on said guide member to be movable in said axial direction, said caliper member straddling a portion of said brake disk and having a fluid actuator provided with a piston on one side thereof to press a first brake pad against one face of said brake disk and a reaction portion on the opposite side thereof to press a second bake pad against the other face of said brake disk,
said second brake pad having a plurality of projecting portions on its backing plate projecting against said reaction portion of said caliper member,
said reaction portion of said caliper member having a plurality of holes, each receiving a respective one of said plurality of projection portions such that said reaction portion supports said plurality of projection portions, and
a plurality of steel plate shims, each having a vibration-proof material covering being interposed between said reaction portion of said caliper member and said backing plate of said second brake pad, each of said shims having a hole rotatably receiving a respective one of said plurality of projection portions of said second brake pad, said backing plate of said second brake pad being formed with an annular groove at a base portion of said projection portions, respectively, and provided with a lubricant in said annular groove, respectively.

* * * * *